United States Patent
Tomihashi et al.

(10) Patent No.: US 7,192,638 B2
(45) Date of Patent: Mar. 20, 2007

(54) FLUORINE-CONTAINING COATING COMPOSITION, PRIMER FOR ETFE-BASED COATINGS, AND COATED ARTICLE

(75) Inventors: Nobuyuki Tomihashi, Settsu (JP); Koichiro Ogita, Settsu (JP); Toshio Miyatani, Settsu (JP); Yasukazu Nakatani, Settsu (JP); Hiroshi Torii, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 59 days.

(21) Appl. No.: 10/476,785

(22) PCT Filed: May 9, 2002

(86) PCT No.: PCT/JP02/04515

§ 371 (c)(1), (2), (4) Date: Nov. 6, 2003

(87) PCT Pub. No.: WO02/090450

PCT Pub. Date: Nov. 14, 2002

(65) Prior Publication Data

US 2004/0147666 A1 Jul. 29, 2004

(30) Foreign Application Priority Data

May 9, 2001 (JP) ............... 2001-138334
Jun. 15, 2001 (JP) ............... 2001-182625

(51) Int. Cl.
- B32B 27/18 (2006.01)
- C08L 27/18 (2006.01)
- C08L 77/00 (2006.01)

(52) U.S. Cl. ............... 428/327; 428/421; 524/502; 524/514; 524/546

(58) Field of Classification Search ............... 428/327, 428/421, 422; 524/457, 502, 506, 514, 544, 524/545, 546; 525/104, 121, 129, 199, 200
See application file for complete search history.

(56) References Cited

U.S. PATENT DOCUMENTS

| | | | |
|---|---|---|---|
| 3,668,193 A | 6/1972 | King | |
| 3,906,060 A | 9/1975 | Mattiussi et al. | |
| 4,546,141 A * | 10/1985 | Gebauer | 524/401 |
| 5,198,491 A | 3/1993 | Honda et al. | |
| 5,536,583 A * | 7/1996 | Roberts et al. | 428/457 |
| 5,679,462 A * | 10/1997 | Soga et al. | 428/447 |
| 6,183,869 B1 * | 2/2001 | Okuda et al. | 428/411.1 |
| 6,228,932 B1 | 5/2001 | Saito | |
| 6,333,372 B1 | 12/2001 | Tomihashi et al. | |

FOREIGN PATENT DOCUMENTS

| | | |
|---|---|---|
| EP | 0 964 037 A1 | 12/1999 |
| JP | 58-27757 A | 2/1983 |
| JP | 08041414 A * | 2/1996 |
| JP | 8-176495 A | 7/1996 |
| JP | 11-349887 | 12/1999 |
| WO | WO 92/10549 A1 | 6/1992 |
| WO | WO 00/36027 A1 | 6/2000 |
| WO | WO 00/56825 A | 9/2000 |

OTHER PUBLICATIONS

MatWeb: Overview—Polyphenylene Sulfide (PPS); Molded, Mar. 2005.*
MatWeb: Overview—Polyperfluoroalkoxyethylene, Molded/Extruded, Mar. 2005.*
MatWeb Material Data Sheet for PES.*
MatWeb Material Data Sheet for ETFE.*
English language translation of JP 08-041414 A, Feb. 1986.*
International Search Report for PCT/JP02/04515 dated Sep. 3, 2002.
English translation of International Preliminary Examination Report for PCT/JP02/04515 dated Apr. 21, 2003.

* cited by examiner

*Primary Examiner*—Ramsey Zacharia
(74) *Attorney, Agent, or Firm*—Sughrue Mion, PLLC

(57) ABSTRACT

A fluorine-containing coating composition obtainable by compounding a macromolecular material with an ethylene-tetrafluoroethylene copolymer having an average particle diameter of 1 to 30 μm. The macromolecular material is one occurring as a liquid or in a state dissolved in a solvent at below the melting initiating temperature of the ethylene-tetrafluoroethylene copolymer. Furthermore, a volume ratio between the ethylene-tetrafluoroethylene copolymer and the macromolecular material is 35:65 to 95:5.

20 Claims, No Drawings

FLUORINE-CONTAINING COATING COMPOSITION, PRIMER FOR ETFE-BASED COATINGS, AND COATED ARTICLE

TECHNICAL FIELD

The present invention relates to a fluorine-containing coating composition and, more particularly, to a fluorine-containing coating composition with which a macromolecular material layer and a fluororesin layer thicker than that in the prior art can be formed by one-coat technique, irrespective of which is upper or lower in the coating film, and to a primer for ETFE-based coatings.

BACKGROUND ART

Fluororesins have excellent characteristics as heat resistance, corrosion resistance, nonadhesiveness and lubricity, so that those are used in various fields of application. Concerning how to use a fluororesin, mention may be made, for example, of the method which comprises applying a coating containing the same to substrates to which the same is desired to be applied, for example rolls for OA equipments, belts for OA equipments and the like, drying, if necessary, the applied coats obtained, and baking the same to form fluororesin-containing coating films.

For example, ethylene-tetrafluoroethylene copolymers (ETFEs), which are excellent in such characteristics as corrosion resistance and heat resistance, are used in molding materials and coatings, among others, and, as coatings, they are used mostly in the form of powder coatings. Generally, such ETFE-based coatings do not require the use of a primer as an undercoat to be applied in advance to materials to be coated and, thus, they can be used in a simple and easy manner, hence are in general use.

On the other side of such expediency, ETFE-based coatings have a problem, namely they are poor in adhesion to materials to be coated. For example, when an ETFE-based coating is applied to form a relatively thick coating film, the coating films readily undergo cracking; therefore, the increase in coating film thickness is restricted. Further, even when an ETFE-based coating has a certain extent of adhesion after application, they still have a problem. Thus, when placed under severe conditions, for example in hot water or at elevated temperatures, the adhesion decreases, with the result that the coating films may undergo cracking or may peel off from the materials to be coated; the stable adhesion may thus be missed to vary widely according to the environment in which the coated articles are placed.

While ETFE-based coatings are also applied to materials to be coated, which are made of a chromium-containing metal, such as stainless steel in certain instances, the application of those coatings to such articles poses a problem since such chromium-containing metal promotes the decomposition of ETFEs.

To solve those problems, the advent of a primer for ETFE-based coatings has become desirable. Known as a primer for ETFE-based coatings is a PPS-based primer which comprises polyphenylene sulfide (PPS) and a polyamideimide resin. However, there is no solvent available for dissolving PPS and, therefore, the PPS-based primer is used in the form of a solid, which is difficult to spread onto materials to be coated evenly and uniformly; as a result, air gaps are readily formed between the primer and substrate and the above-discussed problems about adhesion and processability cannot be fully solved.

In the art, coating films containing a fluororesin other than ETFEs are formed, according to the properties of the substrate used as a material to be coated, by the two-coat technique comprising coating the substrate with a primer containing a binder resin in advance, for the purpose of increasing the adhesion to the substrate, and then applying the fluororesin-containing coating.

This two-coat technique requires the steps for primer coat formation, namely applying the primer to the substrate, drying and heating, for instance, prior to application of the fluororesin-containing coating. Therefore, the advent of a coating process capable of simplifying the process and saving the energy has also been desired.

Available as a method for process simplification and energy saving is the one-coat technique comprising one single application of a coating containing both the fluororesin and binder resin. The intention of this technique is to form a coating film comprising a primer coat and a fluororesin, which have so far been formed by the two-coat technique, by applying one coating.

The coating film obtained by the one-coat technique comprises the binder resin disposed mainly on the substrate side and the fluororesin disposed mainly on the coating film surface side remote from the substrate, so that both the resins have respective concentration gradients from the substrate side to the surface side of the coating film. A coating capable of giving coating films having such concentration gradients is sometimes referred to as "gradient function type coating" as well.

Fluororesin-containing, gradient function type coating can thus form coating films with the fluororesin and binder resin each being disposed in a gradient manner and, therefore, they have been used in a wide range of application fields to make use of the nonadhesiveness, lubricity and other characteristics of the fluororesin.

However, the conventional one-coat technique has a problem; the fluororesin-containing coating film surface layer with a satisfactory thickness cannot be formed thickly enough, so that not only the corrosion resistance, nonadhesiveness and other excellent characteristics intrinsic in the fluororesin cannot be exhibited to a full extent but also poor durability results.

When a conventional gradient type coating for the one-coat technique is used, a layer comparable in thickness to the fluororesin-containing coating films obtainable by the two-coat technique is obtained by a plurality of times of recoating with the gradient function type coating for the one-coat technique, or in case of coating tubes or the like, but such a layer cannot be obtained by one single application of the conventional gradient type coating for the one-coat technique.

Furthermore, in the state of the art, it is impossible, in the coating films obtained, to dispose the fluororesin mainly on the substrate side and the binder resin on the coating film surface side remote from the substrate. Thus, the advent of a coating by which such disposition is possible has been desired for expanding the application range.

SUMMARY OF THE INVENTION

In view of the above-discussed state of the art, it is an object of the present invention in a first and second aspect thereof to provide a coating composition with which a layer mainly comprising a fluororesin and having a thickness comparable to that attainable by the two-coat technique can be formed by one-coat technique, desirably with the fluororesin being disposed mainly on the substrate side and the binder resin being disposed mainly on the coating film surface side remote from the substrate, and the surface layer thus can be formed in an arbitrary manner and which can be used in a wide range of fields.

Thus, a fluorine-containing resin composition according to a first aspect of the present invention is obtainable by compounding a macromolecular material with a melt processible fluororesin having an average particle diameter of 0.1 to 30 μm, in which a volume ratio between the melt processible fluororesin and macromolecular material is 35:65 to 95:5 as melt processible fluororesin:macromolecular material.

A fluorine-containing resin composition according to a second aspect of the present invention is obtained by compounding a macromolecular material with a melt processible fluororesin having an average particle diameter of 1 to 30 μm, in which the macromolecular material is one occurring as a liquid or in a state dissolved in a solvent at below the melting initiation temperature of the melt processible fluororesin and a volume ratio between the melt processible fluororesin and macromolecular material is 35:65 to 95:5 as said melt processible fluororesin: said macromolecular material.

In a third aspect, the present invention has for its object to provide a primer of ETFE-based coatings which has stable adhesiveness and is excellent in processability.

Thus, a primer for ETFE-based coatings according to a third aspect of the present invention comprises an ETFE (A), a heat-resistant resin, a dispersion medium and a heat-resistant resin-dissolving solvent for dissolving the heat-resistant resin, in which said ETFE (A) has an average particle diameter of 0.1 to 30 μm, and a solid matter content ratio between said ETFE (A) and said heat-resistant resin is 40:60 to 90:10 on the mass basis.

DETAILED DISCLOSURE OF THE INVENTION

In the following, the present invention according to the first aspect thereof is described in detail.

The fluorine-containing coating composition according to the first aspect of the present invention is a fluorine-containing coating composition obtainable by compounding a macromolecular material with a melt processible fluororesin having an average particle diameter of 0.1 to 30 μm, in which a volume ratio between the melt processible fluororesin and macromolecular material is 35:65 to 95:5 as melt processible fluororesin:macromolecular material.

When the above-mentioned melt processible fluororesin has an average particle diameter smaller than 0.1 μm, the thickness of the fluororesin layer containing mainly the above-mentioned melt processible fluororesin will become insufficient and, when it exceeds 30 μm, the homogeneity of dispersion of the above-mentioned melt processible fluororesin in the fluororesin layer will be lost, hence the smoothness of the coating film surfaces obtained will worsen. As for the above-mentioned melt processible fluororesin and the volume ratio between the above-mentioned melt processible fluororesin and the above-mentioned macromolecular material, mention will be made later herein.

In the fluorine-containing coating composition according to the first aspect of the present invention, the above-mentioned macromolecular material preferably has at least one characteristics selected from species (a), (b) and (c) mentioned below, especially the characteristic (a). Particulars of these characteristics and the macromolecular material will be described later herein.

(a) It occurs as a liquid or in a state dissolved in a solvent at below the melting initiation temperature of the melt processible fluororesin.
(b) It has a functional group capable of chemically binding to materials to be coated.
(c) It has a value of not lower than 150° C. as its melting point, glass transition point, or softening point.

The fluorine-containing coating composition according to the first aspect of the present invention can form a fluororesin layer mainly containing the melt processible fluororesin as well as a layer mainly containing the macromolecular material, and the above-mentioned fluororesin layer can be obtained by the one-coat technique while attaining a thickness comparable to that obtainable by the two-coat technique.

As regards the method of preparation, method of application and uses of the fluorine-containing coating composition according to the first aspect of the present invention, mention will be made later herein.

The second aspect of the present invention is now described in detail.

The fluorine-containing coating composition according to the second aspect of the present invention is obtainable by compounding a macromolecular material with a melt processible fluororesin. The substance belonging to the above-mentioned macromolecular material differs from those belonging to the above-mentioned melt processible fluororesin. The above-mentioned macromolecular material and the above-mentioned melt processible fluororesin differ in solvent solubility and melting behavior.

The fluorine-containing coating composition according to the second aspect of the present invention can give a coating film by applying it to a material to be coated such as substrates and drying the obtained applied coat, if necessary upon heating, and then baking.

In the above-mentioned applied coat obtained by applying the fluorine-containing coating composition according to the second aspect of the present invention to a material to be coated, the above-mentioned macromolecular material and the above-mentioned melt processible fluororesin particles form a layered structure, and the dissolved or melted macromolecules having passed through the spaces among those particles form a lower layer. Thus, this lower layer is formed by passing the dissolved or melted particles of the above-mentioned macromolecular material through the spaces among the particles of the above-mentioned melt processible fluororesin.

In the present specification, the portion of an applied coat obtained by applying a coating composition or coating to a material to be coated, which is situated on the side of the material to be coated is referred to as "lower layer portion", and the portion which is situated on the side remote from the material to be coated, namely on the applied coat surface side, as "upper layer portion". If the melt processible fluororesin particles are spherical with one and the same diameter and are packed closely so that the volume of the above-mentioned spaces may become minimum, a closest-packed structure will be formed and, on that occasion, the void fraction will be 25.95% in case of closest packing, or 47.64% in case of cubic packing, as already calculated.

In the fluorine-containing coating composition according to the second aspect of the present invention, the above-mentioned melt processible fluororesin particles are, in reality, not in a completely spherical shape. For actual particles, for example nearly spherical powder particles, the void fraction is said to be 33 to 66% ("Funtai Kogaku (Powder Technology)/Fundamentals", 1st edition, published in 1974 by Maki Shoten, page 91).

Therefore, for producing a melt processable fluororesin layer on the surface, it is necessary that the volume of the above-mentioned melt processable fluororesin to the sum of the volume of the above-mentioned melt processable fluororesin and the volume of the macromolecular material mentioned above is not less than 34%, preferably not less than 35%.

When the above-mentioned melt processable fluororesin is to be contained mainly in the above-mentioned upper layer portion, the compounding ratio, by volume, between the above-mentioned melt processable fluororesin and the above-mentioned macromolecular material is 35:65 to 95:5 as melt processable fluororesin:macromolecular material. When the proportion of the above-mentioned melt processable fluororesin is (less than 35):65, the above-mentioned fluororesin layer as the above-mentioned upper layer portion will not be formed properly but will have defects; this is unfavorable. When the proportion of the above-mentioned macromolecular material is 95: (less than 5), the properties required of the above-mentioned lower layer portion, such as adhesion, will not be exhibited to a satisfactory extent. A preferred lower limit to the above-mentioned melt processable fluororesin proportion is 50:50, and a more preferred lower limit thereto is 70:30.

The applied coat having the above-mentioned packing structure is then dried, if necessary upon heating, and baked. By the above-mentioned baking, the components in the above-mentioned upper layer portion are melted and, thereby, the particles constituting the above-mentioned upper layer portion gather together owing to their surface tension to form a film (film formation).

By the above-mentioned baking, the above-mentioned lower layer portion is either crosslinked to form a cured film or is not crosslinked after melting but forms a film upon cooling according to the constituent species of the above-mentioned lower layer portion, the chemical structures thereof and so forth. The lower layer portion is preferred to form a cured film by crosslinking, since, in that case, the above-mentioned upper layer portion constituents can readily rise toward the surface.

The fluorine-containing coating composition according to the second aspect of the present invention is obtained by compounding the above-mentioned melt processable fluororesin having an average particle diameter of 1 to 30 μm with the above-mentioned macromolecular material constituting at least a part of a liquid substance at below the melting initiation temperature of the above-mentioned melt processable fluororesin.

In the present specification, the above-mentioned "at below the melting initiation temperature of the melt processable fluororesin" means "at any temperature not higher than the melting initiation temperature of the melt processable fluororesin". The "at below the melting initiation temperature of the melt processable fluororesin" does not always refer to every temperature not higher than the above-mentioned melting initiation temperature.

The fluorine-containing coating composition according to the second aspect of the present invention forms itself into a coating film by applying it to a material to be coated, at below the melting initiation temperature of the melt processable fluororesin, to obtain the applied coat, then drying, if necessary upon heating, and then baking upon heating to a temperature not lower than the above-mentioned melting initiation temperature.

When the fluorine-containing coating composition according to the second aspect of the present invention is applied to a material to be coated to form the upper layer portion and lower layer portion of an applied coat, the above-mentioned melt processable fluororesin particles each occurring as a solid at the time of application are layered at a temperature at which the above-mentioned macromolecular material constitutes at least a part of a liquid substance and the liquid substance enters the spaces among the layered particles and, at the same time, is disposed under the layered particles. As a result, it is easy for the film to separate into the above-mentioned upper layer portion and the lower layer portion, so that the thickness of the above-mentioned upper layer portion can be increased.

When the above-mentioned macromolecular material constitutes at least a part of a liquid substance at any temperature not higher than the above-mentioned melting initiation temperature after application of the fluorine-containing coating composition according to the second aspect of the present invention to a material to be coated, it may be in a solid state before it constitutes at least a part of the liquid substance or, the dispersion medium or solvent, which is to be described later herein, may evaporate or undergo decomposition after it constitutes at least a part of the liquid substance, for instance.

The above-mentioned macromolecular material may be one constituting at least a part of the above-mentioned liquid substance at any temperature below the above-mentioned melting initiation temperature after application of the fluorine-containing coating composition according to the second aspect of the present invention and continuously constituting at least a part of the liquid substance in the step of coating film formation by baking upon heating, at a temperature not lower than the above-mentioned melting initiation temperature. In this case, generally, the above-mentioned macromolecular material either undergoes crosslinking at the heating temperature for the above baking to give a cured film or does not undergo crosslinking but forms a film after cooling.

Thus, such a wide range of materials can be used as the above-mentioned macromolecular material and, therefore, the fluorine-containing coating composition according to the second aspect of the present invention has a wide range of applications.

The above-mentioned liquid substance may be a one-component system constituted of a single substance or a multicomponent system constituted of two or more substances. The liquid substance may be any liquid form, for example a substance occurring as a liquid as a result of melting, a homogeneous solution, or a dispersed type one in which the dispersion medium forms a liquid phase, such as an emulsion or suspension.

A liquid form of the above macromolecular material or a solution of the macromolecular material dissolved in a solvent is preferred as the above-mentioned liquid substance.

As the above-mentioned liquid substance when it is a liquid form of the above-mentioned macromolecular material, there may be mentioned a melt of the macromolecular material. In that case, the molten macromolecular material itself constitutes the above-mentioned liquid substance. In the present specification, the above-mentioned "melting" refers to a concept including the change in substance state of the above-mentioned macromolecular material from a solid phase to a liquid phase as well as the melting upon heating of the macromolecular material when this is a mixture of two or more solid components. The melting may involve fusion.

The melted macromolecular material is only required to be a liquid. It may be a highly fluid liquid or a viscous liquid.

As the liquid substance when it is a liquid form of the above macromolecular material, there may also be mentioned the form of the macromolecular material serving as a dispersoid in a dispersed system in which a dispersion medium forms a liquid phase, such as an emulsion or suspension. The dispersion medium preferably has a boiling point or decomposition point higher than the melting initiation temperature of the above-mentioned melt processible fluororesin.

When the above-mentioned liquid substance is the one which of the above-mentioned macromolecular material is dissolved in a solvent, the solvent solution of the macromolecular material serves as the above-mentioned liquid substance. The above-mentioned solvent is preferably one having a boiling point or decomposition point higher than the melting initiation temperature of the above-mentioned melt processible fluororesin.

When the liquid substance constituting at least a part of the above-mentioned macromolecular material is in a dispersed state, the above-mentioned liquid substance has an average particle diameter smaller than that of the above-mentioned melt processible fluororesin, so that the separation effect can be increased.

The fluorine-containing coating composition according to the second aspect of the present invention has such characteristics as mentioned above and, when it is applied to a material to be coated, the above-mentioned melt processible fluororesin particles are layered in the resulting applied coat to constitute the upper layer portion in the above-mentioned applied coat. The particles of the above-mentioned macromolecular material in a dissolved or melted state pass through the spaces among the thus-layered particles and form a structure such that they are disposed as the lower layer portion under the upper layer portion.

The applied coat having the above-mentioned structure is further separated as a result of melting, followed by film formation to give a coating film, in the process of drying, then if necessary by heating, and baking. The above-mentioned solvent or dispersion medium generally evaporates upon drying or baking of the applied coat.

In the present specification, the layer mainly containing the melt processible fluororesin in the coating film obtained by applying and baking of the fluorine-containing coating composition according to the second aspect of the present invention is referred to as "fluororesin layer", and the layer mainly containing the above-mentioned macromolecular material as "macromolecular material layer". The above-mentioned fluororesin layer may contain the above-mentioned macromolecular material and, according to need, another component contained in the fluorine-containing coating composition according to the second aspect of the present invention in small amounts. The above-mentioned macromolecular material layer may contain the above-mentioned melt processible fluororesin and, in small amounts, another component as mentioned above.

In both the above-mentioned fluororesin layer and the above-mentioned macromolecular material layer, the melt processible fluororesin and the macromolecular material generally have respective concentration gradients. A coating film having such concentration gradients is sometimes referred to as "gradient coating film". The boundary between both the layers can be identified, for example, by observation of a thinly cut section under a polarizing microscope while adjusting the filter.

The fluorine-containing coating composition according to the second aspect of the present invention forms coating films by the above mechanisms, so that the resulting fluororesin layer can have a significantly greater thickness, preferably 3 to 15 µm, as compared with the thickness of about 1 µm generally obtained with the conventional gradient type coatings utilizing the difference in surface tension.

Furthermore, the fluorine-containing coating composition according to the second aspect of the present invention forms coating films by the above mechanisms, so that it is possible to control the thickness of the melt processible fluororesin layer to be formed as the surface layer by varying the proportions of the above-mentioned melt processible fluororesin, and the above-mentioned liquid substance or the above-mentioned macromolecular material.

When, in the fluorine-containing coating composition according to the second aspect of the present invention, an epoxy resin is used as the macromolecular material and a varnish with a fluororesin being dissolved while the epoxy resin not being dissolved is used, it is possible to form the fluororesin layer as the lower layer portion and the macromolecular material layer as the upper layer portion.

The formation of such a relatively thick fluororesin layer or the formation of a layer containing a different macromolecular substance, such as the above-mentioned macromolecular material, on the above-mentioned fluororesin layer has not yet been realized by the one-coat technique in the art. With the fluorine-containing coating composition according to the second aspect of the present invention, it is possible to realize the formation of the above-mentioned fluororesin layer and the above-mentioned macromolecular material layer by the one-coat technique.

The above-mentioned melt processible fluororesin compounded in the fluorine-containing coating composition according to the second aspect of the present invention has an average particle diameter of 1 to 30 µm, as mentioned above. When it is smaller than 1 µm, the above-mentioned fluororesin layer thickness will not be sufficient and, when it exceeds 30 µm, the uniformity in dispersion of the above-mentioned melt processible fluororesin in the above-mentioned fluororesin layer will be lost and the smoothness of the resulting coating film surface will deteriorate. The surface layer thickness of the coating films obtainable with the conventional gradient type coatings is around 1 µm and, only in case of application as tubes or the like, fluororesin layers having a thickness of around 30 µm have been obtained. There have been no coating films as yet which have a fluororesin layer with a thickness of 3 to 15 µm on the surface side thereof. However, the above-mentioned average particle size is preferably 2 to 20 µm, because there is a market demand for those coating films having a 3 to 15-µm-thick fluororesin layer on the surface side thereof and such a coating film thickness is easily produced.

As the above melt processible fluororesin, there may specifically be mentioned, among others, those obtained by polymerization using, as a monomer component, one or more of such monomers as chlorotrifluoroethylene and like chlorofluorovinyl monomers; trifluoroethylene and like fluorovinyl monomers; and tetrafluoroethylene, hexafluoropropylene, perfluoro (alkyl vinyl ether) monomers and like perfluoro monomers. The monomer composition may further contain one or more of vinyl monomers such as ethylene and propylene. The above-mentioned perfluoro monomers are those whose main chain is constituted of carbon atoms and fluorine atoms, optionally together with an oxygen atom, and which have neither CH nor $CH_2$, thus including perfluorovinyl monomers and perfluoro(alkyl vinyl ether) monomers. The oxygen atom mentioned above generally occurs as an ether oxygen.

A monomer having a functional group such as a hydroxyl group or a carbonyl group may also be used as a comonomer to be copolymerized in a small amount with the above-mentioned monomer components for the above-mentioned melt processable fluororesin. A monomer having a cyclic structure may also be used. As the above-mentioned cyclic structure, there may be mentioned, for example, those having a cyclic ether structure such as a cyclic acetal structure, preferably one in which at least two carbon atoms constituting the above-mentioned cyclic ether structure constitute a part of the main chain of the above-mentioned melt processable fluororesin.

As the above-mentioned melt processable fluororesin, there may be mentioned, among others, ethylene-tetrafluoroethylene copolymers [ETFEs], ethylene-chlorotrifluoroethylene copolymers, propylene-tetrafluoroethylene copolymers and like alkylene-fluoroalkylene copolymers; tetrafluoroethylene-hexafluoropropylene copolymers [FEPs], tetrafluoroethylene-perfluoro(alkyl vinyl ether) copolymers [PFAs] and like perfluoro polymers. The perfluoro polymers are derived from the above-mentioned perfluoro monomers as the monomer components.

Preferred as the above-mentioned melt processable fluororesin are the above-mentioned perfluoro polymers, though depending on the intended use. Although the above-mentioned perfluoro polymers have been utilized in a number of fields using the conventional methods, it is impossible to form coating film surface layers thick when they are used in the form of conventional gradient type coatings. However, by using the fluorine-containing coating composition according to the second aspect of the present invention, it is now possible to form, by the one-coat technique, the above-mentioned fluororesin layers containing mainly the above-mentioned perfluoro polymer thicker than those in the prior art. More preferred as the above-mentioned perfluoro polymers are those copolymerized by using tetrafluoroethylene as comonomers; the above-mentioned perfluoro monomer as another comonomer is not particularly restricted.

The above-mentioned melt processable fluororesin is preferably one substantially insoluble in solvents. When the above-mentioned melt processable fluororesin is readily soluble in a solvent, the amount of the solvent added, which depends on the above-mentioned macromolecular material, may become relatively large relative to the amount of such melt processable fluororesin in case of adding a solvent for dissolving the above-mentioned macromolecular material. In such a case, the above-mentioned melt processable fluororesin, if dissolved in the above-mentioned solvent, can hardly give a fluororesin layer having a satisfactory thickness as mentioned above. It is more preferred for the above-mentioned melt processable fluororesin to have a solubility of not more than 5 parts by mass per 100 parts by mass of the solvent.

It is necessary that the above-mentioned melt processable fluororesin is meltable. When it is meltable, it can form a film by melting upon the above-mentioned baking.

Generally, the meltability of the above-mentioned melt processable fluororesin is represented by the melt flow rate (MFR) as an index of flowability. The MFR is expressed, in accordance with ASTM D 3159, in terms of the weight extruded for 10 minutes through a nozzle having a diameter of 2 mm under a load of 5 Kg. The MFR is measured at 372° C. when the melt processable fluororesin is a perfluoro polymer such as a PFA or FEP and, it is measured at 297° C. for ETFEs. The MFR of the above-mentioned melt processable fluororesin is preferably 0.1 to 100 g/10 minutes from the viewpoint of the leveling, coating film strength and other characteristics of the coating film obtained by applying the above-mentioned fluorine-containing coating composition according to the second aspect of the present invention. A more preferred lower limit is 0.5 g/10 minutes, and a more preferred upper limit is 50 g/10 minutes.

The above-mentioned macromolecular material compounded, together with the above-mentioned melt processable fluororesin, in the fluorine-containing coating composition according to the second aspect of the present invention, constitutes at least a part of the liquid substance at below the melting initiation temperature of the melt processable fluororesin, as mentioned above.

The above-mentioned macromolecular material preferably has a functional group capable of chemically binding to a material to be coated. The material to be coated is a material onto which the fluorine-containing coating composition according to the second aspect of the present invention is applied. The above-mentioned material to be coated with the fluorine-containing coating composition according to the second aspect of the present invention is herein referred to also as "substrate".

The above-mentioned functional group capable of chemically binding to a material to be coated may be one contributing to an intermolecular or intramolecular crosslinking reaction of the above-mentioned macromolecular material. Having such a functional group enable the macromolecular material having such a functional group to attain chemical bonding with the material to be coated as well as to become hardly peeled from the material to be coated, even when such an intermolecular or intramolecular crosslinking reaction of the above-mentioned macromolecular material is hard to proceed.

As the functional group capable of chemically binding to the material to be coated, there may be mentioned, among others, hydroxyl, glycidyl, carbonyl, isocyanato, thionyl, amino, phosphoric and alkoxy groups.

As the macromolecular material having a functional group capable of chemically binding to materials to be coated, there may be mentioned, for example, organic macromolecules such as epoxy resins, polyester resins, urethane resins, acrylic resins, amideimide resins, imide resins, etherimide resins, and polyethersulfone resins; and inorganic macromolecules such as silicone resins and Tyranno resins.

These macromolecular materials can be used properly according the respective intended uses. When hardness or relatively low temperature processability is required, epoxy resins, polyester resins, urethane resins, acrylic resins and the like are preferably used. For preventing coating film defects to secure corrosion resistance and so on, a heat-resistant resin is preferably used to attain sufficient melting of the fluororesin. Preferred as the heat-resistant resin are amideimide resins, imide resins, etherimide resins, polyethersulfone reins and the like. When greater importance is attached to corrosion resistance, one or more species selected from the group consisting of amideimide resins, imide resins and polyethersulfone resins are preferred among others.

When the macromolecular material is a polymer, the above-mentioned functional group capable of chemically binding to materials to be coated may be of the same kind as those which the polymer has, as a polymerization initiator-derived function group, at its terminal in certain cases. It is preferred, however, that some macromolecular materials other than those occurring as the polymerization initiator-derived functional group are present in a molecule.

The above-mentioned macromolecular material preferably has a melting point, glass transition point or softening point of not lower than 150° C. When the melting point, glass transition point or softening point of the above-mentioned macromolecular material is within the above-mentioned range, it generally has heat resistance enough to allow the use in those fields of application where the melt processable fluororesin is used for providing heat resistance. When the macromolecular material has a melting point, glass transition point or softening point lower than the above-mentioned temperature range, the working temperature range is limited and the heat resistance, high-temperature nonstickiness, corrosion resistance and other characteristics intrinsic in the above-mentioned melt processable fluororesin cannot be fully utilized.

The above-mentioned macromolecular material may be a fluorine-containing macromolecule. When the fluorine-containing coating composition according to the second aspect of the present invention is used in those fields of utilization in which greater importance is attached to heat resistance or corrosion resistance, a fluorine-containing macromolecule is particularly preferred as the above-mentioned macromolecular material.

The above-mentioned fluorine-containing macromolecule includes, among others, those obtained by polymerization using, as the monomer components, one or more of fluorine-containing vinyl monomers such as vinyl fluoride, vinylidene fluoride, chlorotrifluoroethylene, trifluoroethylene, tetrafluoroethylene, hexafluoropropylene, and perfluoro(alkyl vinyl ether) species, if necessary together with one or more of other vinyl monomers such as ethylene and propylene.

Thus, the above-mentioned fluorine-containing macromolecule specifically includes, for example, vinyl fluoride-tetrafluoroethylene copolymers, vinyl fluoride-hexafluoropropylene copolymers, poly(vinylidene fluoride), vinylidene fluoride-tetrafluoroethylene copolymers, vinylidene fluoride-hexafluoropropylene copolymers, tetrafluoroethylene-propylene copolymers, ethylene-hexafluoropropylene copolymers, and the like.

Preferably, the above-mentioned fluorine-containing macromolecule has a functional group capable of chemically binding to the above-mentioned material to be coated. However, it may have no such functional groups.

The above-mentioned fluorine-containing macromolecule may be an elastomer such as a fluorine-containing rubber-like elastomer. The elastomer has a glass transition temperature not higher than room temperature and is amorphous. The fluorine-containing macromolecule as the above-mentioned elastomer is particularly suited for use in the fields of application where coating film flexibility and surface nonstickiness are required of the fluorine-containing coating composition according to the second aspect of the present invention, in particular.

When the fluorine-containing macromolecule as the above-mentioned elastomer is used as the above-mentioned macromolecular material, improvements can be attained in particular in durability and flexibility and, for example, in use of rolls for OA equipment, belts for OA equipment and the like, where the prior art methods have failed to provide satisfactory durability or flexibility, greatly improved durability and flexibility better than the prior art can be attained.

Preferably, the above-mentioned elastomer has heat resistance at 200° C. at least. When it has no heat resistance at a temperature lower than 200° C., it becomes difficult to adequately use the fluorine-containing coating composition according to the second aspect of the present invention in such fields of application as mentioned above where heat resistance, high-temperature flexibility and durability are required.

The above-mentioned macromolecular material may be an inorganic macromolecule. The above-mentioned inorganic macromolecule is not particularly restricted if it is any of macromolecules having no C—C bond in the main chain, inclusive of silicone resins, silicone rubbers, and tyranno resins, among others.

In the field where flexibility is required, as application of the fluorine-containing coating composition according to the second aspect of the present invention, the working temperatures are not so high and the above-mentioned melt processable fluororesin can be melted and made into films in a relatively short period of time at the baking temperature for film formation, the above-mentioned inorganic macromolecule may be a fluorine-free macromolecular elastomer such as a silicone rubber, for instance.

In fields of application such as hotplates, frying pans and the like where three-layer coating has been made in the art by applying a ceramic primer, an intermediate primer and a fluororesin in that order to increase the surface hardness, tyranno resins or other inorganic macromolecules with which ceramics can be formed by baking are preferably used as the above-mentioned inorganic macromolecule. When the fluorine-containing coating composition according to the second aspect of the present invention is used, it is possible to obtain, by the one-coat technique, coating films comparable in performance to the coating films obtainable by such conventional three-layer coating technique. A top coat may be provided on the coating films obtained by the one-coat technique, according to need, to give two-coats.

In the fluorine-containing coating composition according to the second aspect of the present invention which comprises the above-mentioned melt processable fluororesin and the above-mentioned macromolecular material, there may be compounded, where necessary, pigments, viscosity modifiers, film-forming agents, solvents, and so forth. The above-mentioned solvents are to be used for viscosity adjustment, differing from those solvents used for dissolving the above-mentioned macromolecular material in case that the above-mentioned liquid substance has the macromolecular substance dissolved in a solvent.

The method of preparing the fluorine-containing coating composition according to the second aspect of the present invention is not particularly restricted if it is any of the conventional methods. For example, the composition is prepared by mixing up the above-mentioned melt processible fluororesin, the above-mentioned pigment, the above-mentioned macromolecular material and so forth, after such a pretreatment as mentioned below as necessary, in appropriate proportions to give a volume ratio between the above-mentioned melt processable fluororesin and the above-mentioned macromolecular material within the range specified hereinabove.

The above-mentioned melt processable fluororesin is formed into the powder form, for example by the method described in Japanese Kokai Publication Sho-63-270740 and generally dispersed in a solvent using an appropriate dispersion medium. As for how to use the dispersion medium, use may be made, for example, of the method comprising wetting the above-mentioned melt processable fluororesin with a solvent such as a lower alcohol, ketone or aromatic hydrocarbon and then dispersing the same by a dispersion medium such as a nonionic surfactant or an anionic surfactant, and the method comprising lowering the surface tension of a solvent such as an alcohol, ketone, ester, amide or aromatic hydrocarbon with a fluorine-containing surfactant, for instance, and dispersing the above-mentioned melt processible fluororesin therein.

The above-mentioned pigment is used generally after pulverization and dispersion of the above-mentioned solvent, the above-mentioned macromolecular material and the above-mentioned surfactant, among others, in a grinding/dispersing machine such as a basket mill, dynamo mill or ball mill. The above-mentioned macromolecular material is generally used after viscosity adjustment by dissolution in a good solvent, followed by dilution with a poor solvent.

Where necessary, the fluorine-containing coating composition according to the second aspect of the present invention may be formed into coatings to be then applied by adjusting to a viscosity allowing the easy application thereof by dilution with an appropriate solvent and using a viscosity modifier or the like.

When the fluorine-containing coating composition according to the second aspect of the present invention is applied, a gradient coating film can be formed by spraying or some other method, to a material to be coated, which is made of aluminum, stainless steel (SUS), iron, a heat-resistance resin or a heat-resistant rubber, for instance, if necessary after surface treatment such as degreasing or surface roughening and drying the resulting applied coat, followed by baking at the temperature not lower than the melting point of the melt processible fluororesin.

The gradient coating film obtained from the fluorine-containing coating composition according to the second aspect of the present invention can have a surface layer thickness of 3 to 15 µm according to the content of the above-mentioned melt processible fluororesin. Such a gradient coating film has thickness comparable those coats obtainable by using the conventional two-coat technique. Therefore, the fluorine-containing coating composition according to the second aspect of the present invention can suitably be used by the one-coat technique even in those fields where the two-coat technique is currently in use.

The above-mentioned gradient coating film obtained from the fluorine-containing coating composition according to the second aspect of the present invention may be subjected to top coating according to need. The above-mentioned top coating is preferably carried out in particular when an inorganic macromolecule is used as the above-mentioned macromolecular material.

The fluorine-containing coating composition according to the second aspect of the present invention can be applied widely, for example, in the fields of household electric appliances and kitchen appliances, such as rice cookers, pots, hotplates, irons, frying pans, and home bakeries, and in the industrial fields, such as rolls for OA equipment, belts for OA equipment, rolls for papermaking, calender rolls for use in film production, injection molds, and for other mold releasing purposes; stirring blades, tank inside surfaces, vessels, columns, centrifuges, and for other corrosion resistance purposes.

The fluorine-containing coating composition according to the second aspect of the present invention can provide nonstickiness and slipping properties, among others, owing to the melt processible fluororesin contained therein, good durability owing to the thickness of fluororesin layer, in addition flexibility is improved but not too hard by using the fluorine-containing macromolecule for the above-mentioned elastomer as the above-mentioned macromolecular material. Thus, the coating composition can suitably be applied to rolls for OA equipment or belts for OA equipment, in particular.

As already mentioned above, the fluorine-containing coating composition according to the second aspect of the present invention is obtained by compounding the macromolecular material with the melt processible fluororesin having an average particle diameter of 1 to 30 µm within the above-specified volume ratio range, and the above-mentioned macromolecular material constitutes at least a part of the liquid substance at below the melting initiation temperature of the melt processible fluororesin and, therefore, when the coating composition is applied to a material to be coated, the fluororesin layer can be formed by the one-coat technique with a thickness comparable to that obtainable by the two-coat technique and, in addition, coating films with the above-mentioned macromolecular material layer formed either on top of or below the fluororesin layer can be obtained.

In this way, the fluorine-containing coating composition according to the second aspect of the present invention can be suitably used by the one-coat technique even in those applications where the two-coat technique or the technique comprising more than two coatings has been required in the art. Further, the fluorine-containing coating composition according to the second aspect of the present invention can form itself into the fluororesin layer thicker as compared with the state of the art and therefore can fully exhibit such excellent properties as heat resistance, durability, corrosion resistance and nonstickiness, which are intrinsic in the melt processible fluororesin. Furthermore, the above-mentioned macromolecular material can be selected from a wide range of substance groups including fluorine-containing macromolecules and inorganic macromolecules and, therefore, through appropriate selection of the macromolecular material from among them, the fluorine-containing coating composition according to the second aspect of the present invention can be applied and put to use in a manner suited for the respective intended uses.

The coating films obtainable by applying the fluorine-containing coating composition according to the first aspect of the present invention or the fluorine-containing coating composition according to the second aspect of the present invention also constitute an aspect of the present invention.

The coated articles having such coating films also constitute an aspect of the present invention.

The fluorine-containing coating composition according to the first aspect of the present invention is obtained by compounding a macromolecular material with a melt processible fluororesin having an average particle diameter of 0.1 to 30 µm within the above-specified volume ratio range. When the melt processible fluororesin is an ethylene-tetrafluoroethylene copolymer [ETFE], the conventional primers for ETFE-based coatings are poor in adhesiveness and processability. When, however, this primer is used, the adhesion to ETFE-based coating films made from the ETFE-based coatings can markedly be improved. In that case, the above-mentioned macromolecular material preferably one occurring as a liquid at below the melting initiation temperature of the melt processible fluororesin, and this liquid is preferably a dispersed phase having a dispersion medium of a liquid phase. The above-mentioned macromolecular material is preferably a heat-resistant resin for realizing a suitable use in the application fields taking advantage of the heat resistance of the above-mentioned melt processible fluororesin. When the above-mentioned macromolecular material is a heat-resistant resin, the above-mentioned dispersed system preferably comprises the above-mentioned heat-resistant resin, a dispersion medium and a heat-resistant resin-dissolving solvent for dissolving the above-mentioned heat-resistant resin. That fluorine-containing coating composition according to the first aspect of the present invention which has such characteristics can be used as a primer for ETFE-based coatings, as mentioned below in detail.

The third aspect of the present invention is now described in detail.

The primer for ETFE-based coatings according to the third aspect of the present invention forms an ETFE-based coating film by applying it to a material to be coated, followed by drying or drying and heating in an appropriate manner to form a primer coat, and then applying an ETFE-based coating onto the above-mentioned primer coat, followed by baking.

The primer for ETFE-based coatings according to the third aspect of the present invention comprises an ETFE (A), a heat-resistant resin, a dispersion medium and a heat-resistant resin-dissolving solvent for dissolving the above-mentioned heat-resistant resin. The above-mentioned ETFE (A) is one component of the primer for ETFE-based coatings according to the third aspect of the present invention, thus a specific one having an average particle diameter within a specific range and a melt flow rate within a specific range, as mentioned later herein, whereas the ETFE in the ETFE-based coatings may be any of the ordinary ETFEs. In this respect, both are to be conceptually distinguished from each other.

The primer for ETFE-based coatings according to the third aspect of the present invention comprises each component mentioned above, in which the above-mentioned ETFE has an average particle diameter within a specified range and the solid matter content ratio between the above-mentioned ETFE (A) and the above-mentioned heat-resistant resin is within a specified range, as mentioned later herein, so that the coat obtained by application of the primer to a material to be coated undergoes layer separation upon drying and baking. Presumably, the layer separation occurs as a result of penetration of the above-mentioned heat-resistant resin into spaces among the ETFE (A) particles to form a concentration gradient between the both in the step of drying and further advancement of separation due to the difference in surface tension between the above-mentioned ETFE (A) and the above-mentioned heat-resistant resin in the step of baking.

As a result of the above layer separation, a heat-resistant resin layer is formed on the side of the material to be coated, and an ETFE (A) layer is formed in the side remote from the material to be coated. In the present specification, the above-mentioned layer, in the above-mentioned primer coat, where the above-mentioned heat-resistant resin exceeds the above-mentioned ETFE (A) in solid matter mass ratio is referred to as "heat-resistant resin layer", and the above-mentioned layer where the above-mentioned ETFE (A) exceeds the above-mentioned heat-resistant resin as "ETFE (A) layer". Generally, the above-mentioned heat-resistant resin layer and ETFE (A) layer may have portions having a concentration gradient, and the boundary between both layers may be indistinct. The above-mentioned ETFE (A) layer and the above-mentioned heat-resistant resin layer combinedly form the primer coat mentioned above.

As a result of layer separation of the primer for ETFE-based coatings according to the third aspect of the present invention into the above layers, the above-mentioned ETFE-based coating film comes into contact with the above-mentioned ETFE (A) layer, whereby the adhesion of the primer to the ETFE-based coating film becomes excellent since the above-mentioned ETFE (A) layer and the above-mentioned ETFE-based coating film have common properties owing to their both containing ETFE. Further, with the primer for ETFE-based coatings according to the third aspect of the present invention, as a result of the above-mentioned layer separation of the primer for ETFE-based coatings, the material to be coated comes into contact with the above-mentioned heat-resistant resin layer, so that the adhesion of the primer to the material to be coated becomes good.

The above-mentioned ETFE (A) has an average particle diameter of 0.1 to 30 µm. When it is less than 0.1 µm, the above-mentioned ETFE (A) layer will readily undergo cracking, hence it will become difficult to increase the thickness of the primer coat. When it exceeds 30 µm, the above-mentioned ETFE (A) in the above-mentioned ETFE (A) layer will show a lack of uniformity in dispersion, hence the adhesion of the primer to the ETFE-based coating film will become uneven, leading to adhesion failure, thus to unfavorable result. A preferred lower limit is 0.2 µm, and a more preferred lower limit is 0.5 µm. A preferred upper limit is 25 µm, and a more preferred upper limit is 20 µm. The tendency toward cracking generally increases with the increase in coating film thickness and therefore can be evaluated in terms of the maximum coating film thickness at which films can be produced without cracking. In the present specification, the above-mentioned maximum coating film thickness attainable to form films without cracking is referred to as "cracking limit thickness".

The above-mentioned ETFE (A) preferably has a melt flow rate (MFR) of 0.1 to 100 g/10 minutes. When the above-mentioned melt flow rate is within the above-mentioned range, adhesion between the above-mentioned ETFE (A) layer and the above-mentioned ETFE-based coating film is improved owing to the flow characteristics of the ETFE (A) layer. When it is less than 0.1 g/10 minutes, the adhesion between the above-mentioned ETFE (A) layer and the above-mentioned ETFE-based coating film tends to decrease and, when it exceeds 100 g/10 minutes, the primer coat tends to undergo tension cracking or stress cracking, possibly resulting in worsening in corrosion resistance, thus unfavorable. Amore preferred lower limit is 0.5 g/10 minutes, and a more preferred upper limit is 50 g/10 minutes. By adjusting the composition to be subjected to copolymerization and the molecular weight, which are to be mentioned below, it becomes possible for the above-mentioned ETFE (A) to have a melt flow rate within the above range. In the present specification, the above melt flow rate is the value measured at a temperature of 297° C. and under a load of 5 kg according to ASTM D 3159.

The above-mentioned ETFE (A) preferably has the ethylene/tetrafluoroethylene mole ratio amounting to 20/80 to 80/20 as a monomer composition. When the mole fraction of ethylene is less than 20/80, the productivity will be poor. When it exceeds 80/20, the corrosion resistance tends to become poor. A more preferred upper limit to the ethylene mole fraction is 60/40 and, within this range, the corrosion resistance can be improved.

Preferably, the monomer composition for the above-mentioned ETFE (A) further comprises, in addition to ethylene and tetrafluoroethylene, another fluorine-containing monomer for the purpose of controlling the crystallinity. Another fluorine-containing monomer as mentioned above is not particularly restricted if it is any one capable of adding to both ethylene and tetrafluoroethylene. Fluorine-containing vinyl monomers containing 3 to 8 carbon atoms are easy to use, however, and examples thereof are hexafluoroisobutylene and $CH_2=CFC_3F_6H$. Preferably, another fluorine-containing monomer as mentioned above accounts for not more than 5 mole percent relative to all the monomer components for the above-mentioned ETFE (A).

The above-mentioned ETFE (A) can be obtained by copolymerization according to any of the polymerization methods known in the art, for example in the manner of emulsion polymerization. The ETFE powder obtained by copolymerization is ground according to need so that it may have an average particle diameter within the above-specified range. The above-mentioned method of grinding is not particularly restricted but use may be made of the methods known in the art, for example the method described in Japanese Kokai Publication Sho-63-270740, just as it is the case with the grinding of the melt processible fluororesin constituting the fluorine-containing coating composition according to the second aspect of the present invention. Thus, for example, mention may be made of the method comprising compressing the above ETFE powder into a sheet-like form with a roll and grinding the same by means of a grinder, followed by classification. In case that the above-mentioned ETFE (A) is obtained by means of emulsion polymerization or suspension polymerization and the above-mentioned respective conditions are satisfied, the dispersion may be used as it is without isolating only the resin component obtained.

The primer for ETFE-based coatings according to the third aspect of the present invention comprises a heat-resistant resin in addition to the ETFE (A) mentioned above. The heat-resistant resin generally functions as a binder in the primer for ETFE-based coatings according to the third aspect of the present invention.

The heat-resistant resin is not particularly restricted if it is any of those resins generally known to have heat resistance. Preferred are, however, those soluble in heat-resistant resin-dissolving solvents, which are mentioned later herein.

Preferred as such heat-resistant resin, from the viewpoint of heat resistance, solubility and so on, is at least one resin selected from the group consisting of polyamideimide resins, polyethersulfone resins and polyimide resins. Two or more of them may be also be used.

The solid matter content ratio between the above-mentioned ETFE (A) and the above-mentioned heat-resistant resin is 40:60 to 90:10 on the mass basis. When the proportion of the above-mentioned ETFE (A) is (less than 40):60, the adhesion to the above-mentioned ETFE-based coating film deteriorates, allowing interlaminar peeling, hence leading to unfavorable results. When it is (exceeding 90):10, the adhesion to the material to be coated decreases. A preferred lower limit to the proportion of the above-mentioned ETFE (A) is 45:55, and a preferred upper limit is 80:20.

The primer for ETFE-based coatings according to the third aspect of the present invention contains a heat-resistant resin-dissolving solvent for dissolving the heat-resistant resin mentioned above. The primer for ETFE-based coatings according to the third aspect of the present invention can improve its adhesion to the material to be coated, as a result of dissolving the above-mentioned heat-resistant resin in the above-mentioned heat-resistant resin-dissolving solvent and thus uniformly dispersing it in the primer for ETFE-based coatings to make it to spread all over the material to be coated upon application.

The above-mentioned heat-resistant resin-dissolving solvent is not particularly restricted if it is any solvent capable of dissolving the above-mentioned heat-resistant resin. Preferred are, however, those having a boiling point of not lower than 100° C., for example N-methyl-2-pyrrolidone, N,N-dimethylacetamide, N,N-dimethylformamide, and the like.

The amount of the above heat-resistant resin-dissolving solvent is preferably not less than 10% relative to the heat-resistant resin on the mass basis. Within the above range, the solvent makes it possible to spread the above-mentioned heat-resistant resin over the material to be coated and thereby improve the adhesion to the material to be coated, as mentioned hereinabove. When the amount is less than 10%, the above-mentioned heat-resistant resin on the material to be coated is dispersed uneven, resulting in inferior adhesion. A more preferred lower limit is 50%. As the amount of the heat-resistant resin-dissolving solvent increases, the adhesion to the material to be coated tends to improve. From the commercial production viewpoint, however, a preferred upper limit is generally set at 500%, more preferably 350%.

The primer for ETFE-based coatings according to the third aspect of the present invention contains a dispersion medium in addition to the ETFE (A), the heat-resistant resin and the heat-resistant resin-dissolving solvent, as mentioned above. The primer for ETFE-based coatings according to the third aspect of the present invention thus forms a solution of the above-mentioned heat-resistant resin in the heat-resistant resin-dissolving solvent and a dispersed system (dispersion) having the above-mentioned ETFE (A) dispersed as a dispersoid, so that it can be applied to all over the material to be coated.

At least one solvent selected from the group consisting of water, alcohols, ketones, esters, and aromatic hydrocarbons is used as the dispersion medium. From the working environment viewpoint, however, water is preferred and suitably used as the dispersion medium.

When water is used as the above-mentioned dispersion medium, a surfactant is necessary for dispersing the above-mentioned ETFE (A). The surfactant is not particularly restricted if it is any of nonionic surfactants, anionic surfactants and cationic surfactants. However, one capable of evaporating or decomposing at relatively low temperatures around 250° C. is preferred, and a nonionic one and an anionic one are more preferred.

When water is used as the above-mentioned dispersion medium, a rust preventive is required to prevent the material to be coated from corrosion in the step of coating. The rust preventive is not particularly restricted if it is, for example, dibutylamine or the like.

When the above-mentioned ETFE (A) obtained by emulsion polymerization is used in the form of a dispersion without isolating the resin component, the water used in emulsion polymerization may be used as the above-mentioned dispersion medium and, in this case, water may additionally be added. When the above-mentioned ETFE (A) obtained by emulsion polymerization is used as such, the surfactant used in emulsion polymerization as it is may be used as a part or the whole of the above-mentioned surfactant. Similarly, when the above-mentioned ETFE (A) is obtained by suspension polymerization, the solvent used in suspension polymerization may be used as the above-mentioned dispersion medium if it is within the above-mentioned species of dispersion medium.

The primer for ETFE-based coatings according to the third aspect of the present invention may contain a heat stabilizer in addition to the above-mentioned essential components, namely ETFE (A), a heat-resistant resin, a heat-resistant resin-dissolving solvent and a dispersion medium. When it contains a heat stabilizer, the primer for ETFE-based coatings according to the third aspect of the present invention can be prevented from oxidation of the above-mentioned ETFE (A) and the above-mentioned heat-resistant resin upon heating and the like, in the step of ETFE-based coating film formation and the thermal degradation thereof can be reduced, with the result that the adhesion stability can be improved.

The above-mentioned heat stabilizer is not particularly restricted but preferably is, for example, a metal oxide, an amine type antioxidant, or an organic sulfur-containing compound.

The above-mentioned metal oxide is not particularly restricted if it is any one capable of functioning as a heat stabilizer. For example, there may be mentioned oxides of typical metals such as Cu, Al, Fe, Co, and Zn.

The above-mentioned amine type antioxidant is preferably an amine compound exhibiting stability at above 250° C. in view of the above-mentioned heating step. For example, mention may be made of aromatic amines, preferably phenyl or naphthyl group-containing amine derivatives such as dinaphthylamine, phenyl-α-naphthylamine, phenyl-β-naphthylamine, diphenyl-p-phenylenediamine, and phenylcyclohexyl-p-phenylenediamine.

The above-mentioned organic sulfur compound is not particularly restricted but benzimidazole type mercaptan compounds, benzothiazole type mercaptan compounds and thiocarbamic acids, and salts of these, thiuram monosulfide, and the like. The salts are not particularly restricted but include salts with Zn, Sn, Cd, Cu, and Fe, for instance.

The above-mentioned heat stabilizer may comprise one single species or two or more species.

In particular, when the above-mentioned primer for ETFE-based coatings according to the third aspect of the present invention is used in the fields of pharmaceuticals and semiconductors, among others, where elution of metal ions is undesirable, the above heat stabilizer is preferably a nonmetallic compound leaving no residue and, for example, there may be mentioned amine type antioxidants and organic sulfur compounds, excluding metal salts thereof.

When it is contained in the primer for ETFE-based coatings according to the third aspect of the present invention, the amount of the above-mentioned heat stabilizer is 0.001 to 5% relative to the solid matter of the above-mentioned ETFE (A) on the mass basis. When it is less than 0.001%, the heat stabilizing effect will be insufficient and, when it exceeds 5%, the influence of foaming due to decomposition of the heat stabilizer unfavorably becomes significant. A preferred lower limit is 0.003%, and a preferred upper limit is 2%.

The primer for ETFE-based coatings according to the third aspect of the present invention may contain one or more additives, as necessary, in addition to each component as mentioned above. The additives are not particularly restricted but include, for example, those used in ordinary coating primers, for example pigments. The pigments are not particularly restricted but include color pigments, such as carbon, titanium oxide, red iron oxide and mica, rust preventive pigments, calcined pigments and so forth.

The primer for ETFE-based coatings according to the third aspect of the present invention is prepared by any of the conventional methods, for example by the method comprising mixing the above-mentioned ETFE (A), a heat-resistant resin, and dispersion medium, together with a surfactant, a rust preventive and another additive as necessary, and adding the heat-resistant resin-dissolving solvent, followed by stirring to effect dispersion.

The thus-obtained primer for ETFE-based coatings according to the third aspect of the present invention, when applied to a material to be coated, dried and heated, in an appropriate manner, forms a primer coat.

The material to be coated is not particularly restricted if the articles on which an ETFE-based coating film can be formed. For example it includes pipes, tanks, vessels, columns, valves, pumps, and like articles, which are to be provided with linings. The material to be coated may be subjected in advance to surface treatment, such as cleaning and/or sandblasting, according to need. The sandblasting, which comprises blowing sand, such as a silica sand or alumina powder, to the material to be coated for roughening the surface thereof, is preferably carried out from the adhesion improvement viewpoint.

The method of application to the material to be coated is not particularly restricted if it is selected properly according to the form or shape of the material to be coated. For example, there may be mentioned conventional methods such as spray coating, dip coating, brushing, and electrostatic coating. The application can be carried out to attain a dry coating film thickness of 10 to 60 μm. Thus, the cracking limit thickness can be increased with the primer for ETFE-based coatings according to the third aspect of the present invention. The above heating is carried out at a temperature not lower than the level causing the above-mentioned layer separation, for example at 60 to 120° C. Prior to heating, drying maybe carried out at room temperature, and this drying may make the above heating conditions milder.

Then, an ETFE-based coating is applied onto the thus-obtained primer coat and heated for baking to form an ETFE-based coating film.

The ETFE-based coating comprises ETFE as a main component and contains some other components, such as an additive, according to need. It is not particularly restricted. The above-mentioned ETFE-based coating generally occurs as a powder coating. The method of preparing the powder coating is not particularly restricted but includes those known in the art, for example the method comprising melt-kneading the ETFE and other ingredients as necessary, followed by grinding, and the method comprising grinding by the method described hereinabove for grinding the ETFE (A), followed by classification.

The ETFE in the above-mentioned ETFE-based coatings is not particularly restricted. The ratio between the monomer components ethylene and tetrafluoroethylene, the other optional monomer component and the copolymerization proportion thereof, the melt flow rate, the average particle diameter, and other characteristics may be the same or different from those of ETFE (A). For improving the adhesion between the above-mentioned primer coat and the above-mentioned ETFE-based coating film, it is preferred that the above characteristics is the same or similar to those of the above-mentioned ETFE (A).

The method of applying the ETFE-based coatings is not particularly restricted but mention may be made of electrostatic coating and rotolining, for instance. The heating/baking temperature is for example 250 to 350° C.

The primer for ETFE-based coatings according to the third aspect of the present invention, in which an ETFE (A) having an average particle diameter of 0.1 to 30 μm and a heat-resistant resin are combinedly used in a specific solid matter content ratio of 40:60 to 90:10 on the mass basis, as mentioned hereinabove, is excellent in both adhesion to the material to be coated and adhesion to the ETFE-based coating film formed thereon and is good in processability, hence is suitably used as a primer for ETFE-based coatings.

The primer coat obtained by applying the primer for ETFE-based coatings according to the third aspect of the present invention to a material to be coated also constitutes an aspect of the present invention.

Furthermore, the coated article comprising the material to be coated and the above-mentioned primer coat and ETFE-based coating film, in which the primer coat is formed on the material to be coated and the ETFE-based coating film is formed on the primer coat, also constitutes an aspect of the present invention.

BEST MODES FOR CARRYING OUT THE INVENTION

The following examples illustrate the present invention in further detail. These examples are, however, by no means limitative of the scope of the present invention.

EXAMPLE 1

A PFA powder (88 g) obtained by grinding and having an average particle diameter of 12 µm, 5 g of triethylamine salt of perfluorooctanoic acid, 100 g of N-methyl-2-pyrrolidone and 100 g of isopropyl alcohol were placed in a container made of SUS, and the PFA powder was uniformly wetted with and dispersed in the solvent using a stirrer to give a dispersion. To this dispersion were added 79 g of a polyamideimide (30% solution in N-methyl-2-pyrrolidone, product of Hitachi Chemical Co., Ltd.), 50 g of xylene and 50 g of tetraethylene glycol butyl ether, followed by dispersing using a stirrer to give a coating.

This coating was applied, by spraying, to an aluminum foil (100 µm in thickness), 150 mm×200 mm in size, then dried at 100° C. for 30 minutes, and baked at 380° C. for 20 minutes to give a 30 µm-thick coating film. This coated sheet was cut thinly in the sectional direction using a microtome (product of Leica, Germany), the section was observed under a polarizing microscope at a magnification of 1,000 while adjusting the filter so that the boundary might be confirmed, and the thickness of the surface layer (PFA layer) was measured. The result is shown in Table 1.

EXAMPLES 2, 3, 6 AND 9

Coatings were prepared, applied, dried and baked to thereby give coating films in the same manner as in Example 1 except that the melt processable fluororesins, average particle diameters and formulations were as shown in Table 1. The coating film thickness and surface layer thickness were measured in the same manner as in Example 1. The results are shown in Table 1.

EXAMPLE 4

A PFA powder (88 g) obtained by grinding and having an average particle diameter of 12 µm, 5 g of triethylamine salt of perfluorooctanoic acid, 100 g of N-methyl-2-pyrrolidone and 100 g of isopropyl alcohol were placed in a container made of SUS, and the PFA powder was uniformly wetted with and dispersed in the solvent using a stirrer. To the resulting dispersion was added and dispersed therein 120 g of DPA 382 (one-pack type fluorine-containing rubber-based coating, solid content 25% by mass, product of Daikin Industries) as a fluorine-containing rubber-based coating to give a coating composition with a PFA/fluorine-containing rubber ratio (volume ratio) of 70/30. This coating composition was applied in the same manner as in Example 1, dried at 100° C. for 30 minutes, and baked at 340° C. for 30 minutes to give a coating film. The coating film thickness and surface layer thickness were measured in the same manner as in Example 1. The results are shown in Table 1.

EXAMPLE 5

Coatings were obtained in the same manner as in Example 4 except that an FEP powder having an average particle diameter of 8 µm was used in lieu of the PFA powder and coating films were obtained in the same manner as in Example 4 except that the baking was carried out at 300° C. for 30 minutes. The coating film thickness and surface layer thickness were measured in the same manner as in Example 1. The results are shown in Table 1.

EXAMPLE 7

An FEP powder (88 g) obtained by grinding and having an average particle diameter of 15 µm, 5 g of triethylamine salt of perfluorooctanoic acid, 100 g of N-methyl-2-pyrrolidone and 100 g of isopropyl alcohol were placed in a container made of SUS, and the FEP powder was uniformly wetted with and dispersed in the solvent using a stirrer. To the resulting dispersion was added and dispersed uniformly therein 20 g of Epikote 828 (product of Yuka Shell Epoxy) as an epoxy resin to give a coating. Using this coating, a coating film was obtained in the same manner as in Example 1 except the modification in baking conditions such that 30 minutes of baking at 180° C. was followed by 3 minutes of baking at 380° C. The coating film thickness and surface layer thickness were measured in the same manner as in Example 1. The results are shown in Table 1.

EXAMPLE 8

Coatings were obtained and coating films were produced in the same manner as in Example 7 except that the formulation was modified, and the coating film thickness and surface layer thickness were measured. The results are shown in Table 1.

COMPARATIVE EXAMPLES 1, 4 AND 6

Coatings were obtained and coating films were produced and measured for coating film thickness and surface layer thickness in the same manner as in Example 1 except that the melt processable fluororesins, average particle diameters and formulations were as specified in Table 1. The results are shown in Table 1.

COMPARATIVE EXAMPLES 2 AND 5

Coatings were obtained and coating films were produced and measured for coating film thickness and surface layer thickness in the same manner as in Example 4 except that the melt processable fluororesins, average particle diameters and formulations were as specified in Table 1. The results are shown in Table 1.

COMPARATIVE EXAMPLE 3

A coating was obtained and a coating film was produced and measured for coating film thickness and surface layer thickness in the same manner as in Example 7 except that an FEP powder having an average particle diameter of 0.15 µm was used. The results are shown in Table 1.

TABLE 1

| | Fusible fluororesin | Average particle size (μm) | Macromolecular material | Formulation:fusible fluororesin/macromolecular material (volume ratio) | Coat film thickness (μm) | Surface layer thickness (μm) |
|---|---|---|---|---|---|---|
| Example 1 | PFA | 12 | Polyamideimide | 70/30 | 30 | 11 |
| Example 2 | PFA | 5 | Polyamideimide | 50/50 | 25 | 4 |
| Example 3 | PFA | 12 | Polyamideimide | 40/60 | 35 | 2 |
| Example 4 | PFA | 12 | Fluorine-containing rubber | 70/30 | 30 | 10 |
| Example 5 | FEP | 8 | Fluorine-containing rubber | 70/30 | 30 | 8 |
| Example 6 | FEP | 15 | Polyamideimide | 70/30 | 35 | 9 |
| Example 7 | FEP | 15 | Epoxy resin | 70/30 | 30 | 5 |
| Example 8 | FEP | 15 | Epoxy resin | 40/60 | 35 | 3 |
| Example 9 | FEP | 8 | Polyamideimide | 80/20 | 35 | 12 |
| Compar. Ex. 1 | FEP | 0.15 | Polyamideimide | 70/30 | 30 | 1–2 |
| Compar. Ex. 2 | FEP | 0.15 | Fluorine-containing rubber | 70/30 | 25 | 1 |
| Compar. Ex. 3 | FEP | 0.15 | Epoxy resin | 70/30 | 30 | 1–2 |
| Compar. Ex. 4 | PFA | 0.2 | Polyamideimide | 70/30 | 25 | 1 |
| Compar. Ex. 5 | PFA | 12 | Fluorine-containing rubber | 20/80 | 30 | 1 |
| Compar. Ex. 6 | PFA | 40 | Polyamideimide | 50/50 | 30 | 10–15 |

The specific gravities of the formulation components used were 2.2 for the PFA and FEP, 1.4 for the polyamideimide, 1.75 for the fluorine-containing rubber, and 1.2 for the epoxy resin.

From Table 1, it was revealed that the coating films obtained in Examples 1 to 9 using the coatings prepared by compounding the PFA or FEP having an average particle diameter within the range of 1 to 30 μm in a volume ratio between the resin and macromolecular material within the range of 35:65 to 95:5 had a surface layer thickness of 3 to 12 μm, whereas, in Comparative Examples 1 to 4 in which the PFA or FEP had an average particle diameter of less than 1 μm and in Comparative Example 5 in which the proportion of the melt processable fluororesin was small, the surface layer thickness was only 1 to 2 μm and, in Comparative Example 6 in which the average particle diameter of PFA exceeded 30 μm, the surface layer thickness was comparable to those in the Examples but the coating film surface showed poor leveling and pinhole formation.

EXAMPLE 10

A primer for ETFE-based coatings was prepared by placing, in a stainless steel vessel, 30 g of an ETFE powder with an ethylene/tetrafluoroethylene/$CH_2=CFC_3F_6H$ mole ratio of 33/65/2 (melt flow rate at 297° C.: 8 g/10 minutes; average particle diameter: 10 μm), 10 g of a powder of a polyamideimide (PAI, product of Hitachi Chemical Company) with an average particle diameter of 1.5 μm as prepared by grinding the PAI as a heat-resistant resin, 0.7 g of a nonionic surfactant (Nonion HS-208, product of NOF Corporation), 0.1 g of dibutylamine and 25 g of pure water, thoroughly stirring the mixture at 300 rpm for 20 minutes using a propeller stirrer, and then adding 20 g of N-methyl-2-pyrrolidone with stirring, followed by thorough stirring for attaining sufficient dispersion.

EXAMPLE 11

A primer for ETFE-based coatings was prepared by placing, in a stainless steel vessel, 50 g of a 60% dispersion of an ETFE obtained by emulsion polymerization and having an ethylene/tetrafluoroethylene/$CH_2=CFC_3F_6H$ mole ratio of 33.5/65/1.5 (melt flow rate at 297° C.: 15 g/10 minutes; average particle diameter: 0.25 μm), 10 g of a powder of a polyamideimide (PAI, product of Hitachi Chemical Company) with an average particle diameter of 1.5 μm as prepared by grinding the PAI, 0.5 g of a nonionic surfactant (Nonion HS-208, product of NOF Corporation), 0.1 g of dibutylamine and 5 g of pure water, thoroughly stirring the mixture at 300 rpm for 20 minutes using a propeller stirrer, and then adding 20 g of N-methyl-2-pyrrolidone with stirring, followed by thorough stirring for attaining sufficient dispersion.

EXAMPLE 12

A primer for ETFE-based coatings was prepared in the same manner as in Example 10 except that 10 g of the PAI powder and 20 g of a polyethersulfone (product of Sumitomo Chemical Company) ground to an average particle size of 2 μm were used combinedly as the heat-resistant resin.

EXAMPLE 13

A primer for ETFE-based coatings was prepared in the same manner as in Example 10 except that the ETFE was used in an amount of 24 g and the PAI powder in an amount of 16 g.

EXAMPLE 14

A primer for ETFE-based coatings was prepared in the same manner as in Example 10 except that a polyimide (product of Hitachi Chemical Company) ground to an average particle diameter of 2.5 μm was used in lieu of the PAI.

EXAMPLE 15

A primer for ETFE-based coatings was prepared in the same manner as in Example 10 except that the ETFE having an average particle diameter of 4.8 μm was used.

EXAMPLE 16

A primer for ETFE-based coatings was prepared in the same manner as in Example 10 except that the ETFE having an average particle size of 13.7 μm was used.

EXAMPLE 17

A primer for ETFE-based coatings was prepared in the same manner as in Example 10 except that a CuO powder was further added in an amount of 0.1% by mass relative to the ETFE.

EXAMPLE 18

A primer for ETFE-based coatings was prepared in the same manner as in Example 10 except that a 2-mercapto-benzimidazole powder was further added in an amount of 0.1% by mass relative to the ETFE.

EXAMPLE 19

A primer for ETFE-based coatings was prepared in the same manner as in Example 10 except that the ETFE having an ethylene/tetrafluoroethylene/$CH_2$=$CFC_3F_6H$ mole ratio of 33.8/65/1.2, a melt flow rate at 297° C. of 0.05 g/10 minutes and an average particle diameter of 3.5 μm was used.

COMPARATIVE EXAMPLE 7

A primer for ETFE-based coatings was prepared in the same manner as in Example 10 except that the ETFE having an average particle diameter of 50 μm was used.

COMPARATIVE EXAMPLE 8

A primer for ETFE-based coatings was prepared in the same manner as in Example 10 except that 15 g of the ETFE and 25 g of the PAI powder were used.

COMPARATIVE EXAMPLE 9

A primer for ETFE-based coatings was prepared in the same manner as in Example 10 except that the addition of N-methyl-2-pyrrolidone was omitted.

Evaluation Methods

1. Adhesion Testing of Primers for ETFE-Based Coatings

A degreased iron substrate (100 mm×200 mm×5 mm) was blasted with Tosa Emery (product of Ujiden Chemical Industry Co.) as a 80-mesh alumina powder at a pressure of 0.5 MPa, the blasting powder was then removed by means of air, each primer for ETFE-based coatings as obtained in the above manner was applied thereonto by spraying so as to give a dry coating film thickness of 15 to 20 μm, the coat was dried at 80° C. for 30 minutes, a powder coating comprising an ethylene/tetrafluoroethylene/hexafluor-oisobutylene copolymer in a mole ratio of 33/65/2 (melt flow rate at 297° C.: 8 g/10 minutes; average particle diameter: 60 μm) was applied by the electrostatic coating technique, and baking was carried out at 300° C. for 30 minutes to give a coated article having a coated film with a thickness of about 800 μm. This coating film was given cuts with a knife at 10-mm intervals and subjected to peel testing at a rate of 50 mm/minute using a Shimadzu autograph DSC-500. Separately, the same coated article was immersed in boiling water at 95° C. for 20 hours or subjected to 72 hours of annealing treatment in an oven at 200° C., and each test sample prepared was subjected to peel testing under the same conditions. The results are shown in Table 2.

2. Cracking Limit Thickness

Each primer for ETFE-based coatings obtained in the above manner was applied repeatedly 5 to 10 times to a dry coating film thickness of 10 μm, 15 μm, 20 μm, 25 μm, 30 μm, 35 μm, etc., while masking with a sheet or the like in each application, and the thickness of the coat portion resulting from repeated application just prior to the coating film thickness at which cracking occurred was measured and recorded as "cracking limit thickness". The results thus obtained are shown in Table 2.

TABLE 2

| | | Adhesion (kg/cm), peeling at 90° | | |
|---|---|---|---|---|
| | Cracking limit thickness (μm) | Initial | After 20 hours in water at 95° C. | After 72 hours of annealing at 200° C. |
| Example 10 | 25 | 16 | 16 | 12< |
| Example 11 | 10 | 10 | 9 | 9< |
| Example 12 | 25 | 12 | 11 | 10< |
| Example 13 | 30 | 15 | 15 | 13< |
| Example 14 | 20 | 12 | 12 | 10< |
| Example 15 | 20 | 17 | 16 | 15< |
| Example 16 | 30 | 15 | 12 | 12< |
| Example 17 | 25 | 16 | 16 | 16< |
| Example 18 | 30 | 17 | 16 | 16< |
| Example 19 | 30 | 6 | 1 | — |
| Compar. Ex. 7 | 35 | 12 | 5 | — |
| Compar. Ex. 8 | 20 | 5 | 2 | — |
| Compar. Ex. 9 | 10 | 4 | 2 | — |

From Table 2, it was revealed that the adhesion was inferior in Comparative Examples 7 to 9 whereas, in Examples 10 to 18, the adhesion was good and, even after hot water treatment or heating treatment, the adhesion was retained at a level comparable or only slightly inferior to the initial level, without any significant variation in adhesion. Comparison between Example 10 and Example 19 revealed that, in attaining an improvement in adhesion, it is important for the melt flow rate to be 0.1 to 100 g/10 minutes.

INDUSTRIAL APPLICABILITY

With the fluorine-containing coating composition according to the first aspect of the present invention and the fluorine-containing coating composition according to the second aspect of the present invention, which have the respective constitutions mentioned above, it is possible to form, by the one-coat technique, a layer mainly comprising a melt processible fluororesin which layer is comparable in thickness to that obtainable by the two-coat technique and, further, it is possible to form a layer mainly comprising a binder resin on the layer mainly comprising the fluororesin, or form both the layers upside down.

The primer for ETFE-based coatings according to the third aspect of the present invention, which has the constitution mentioned above, is excellent in adhesion to the material to be coated and to the ETFE-based coating film to be formed thereon and has good processability.

The invention claimed is:

1. A fluorine-containing coating composition obtainable by compounding a macromolecular material with an ethylene-tetrafluoroethylene copolymer having an average particle diameter of 10 to 30 μm
wherein said macromolecular material is one occurring as a liquid or in a state dissolved in a solvent at below the melting initiation temperature of said ethylene-tetrafluoroethylene copolymer and
a volume ratio between said ethylene-tetrafluoroethylene copolymer and said macromolecular material is 35:65 to 95:5 as said ethylene-tetrafluoroethylene copolymer: said macromolecular material.

2. The fluorine-containing coating composition according to claim 1,
wherein the macromolecular material is a fluorine-containing macromolecule.

3. The fluorine-containing coating composition according to claim 1,
wherein the macromolecular material is an elastomer.

4. The fluorine-containing coating composition according to claim 3,
wherein the elastomer has heat resistance at 200° C. at least.

5. The fluorine-containing coating composition according to claim 1,
wherein the macromolecular material is an inorganic polymer.

6. The fluorine-containing coating composition according to claim 1,
which is to be used in manufacturing rolls for OA equipment or belts for OA equipment.

7. The fluorine-containing coating composition according to claim 1,
which is to be used by one-coat technique.

8. The fluorine-containing coating composition according to claim 1,
wherein the liquid is a dispersed system having a dispersion medium of a liquid phase.

9. The fluorine-containing coating composition according to claim 8,
wherein the macromolecular material is a heat-resistant resin and the dispersed system comprises said heat-resistant resin, the dispersion medium and a heat-resistant resin-dissolving solvent for dissolving said heat-resistant resin.

10. The fluorine-containing coating composition according to claim 8,
which serves as a primer for ETFE-based coatings.

11. The fluorine-containing coating composition according to claim 1,
wherein the macromolecular material is a heat-resistant resin.

12. A coating film obtained by applying the fluorine-containing coating composition according to claim 1 onto a material to be coated, wherein the macromolecular material is a heat-resistant resin and is dissolved in a solvent.

13. A coated article
having the coating film according to claim 12.

14. A primer for ETFE-based coatings
comprising an ETFE (A), a heat-resistant resin, a dispersion medium and a heat-resistant resin-dissolving solvent for dissolving said heat-resistant resin
wherein said ETFE (A) has an average particle diameter of 10 to 30 μm and
a solid matter content ratio between said ETFE (A) and said heat-resistant resin is 40:60 to 90:10 on the mass basis.

15. The primer for ETFE-based coatings according to claim 14,
wherein the heat-resistant resin-dissolving solvent accounts for not less than 10% relative to the heat-resistant resin on the mass basis.

16. The primer for ETFE-based coatings according to claim 14,
wherein the ETFE (A) has a melt flow rate of 0.1 to 100 g/10 minutes.

17. The primer for ETFE-based coatings according to claim 14,
wherein the heat-resistant resin is at least one resin selected from the group consisting of polyamideimide resins, polyethersulfone and polyimide resins.

18. The primer for ETFE-based coatings according to claim 14,
which further comprises a heat stabilizer in an amount of 0.001 to 5% relative to the solid matter of ETFE (A) on the mass basis.

19. A primer coat obtained by applying the primer for ETFE-based coatings according to claim 14 onto a material to be coated.

20. A coated article
comprising a material to be coated, the primer coat according to claim 19 and an ETFE-based coating film
wherein said primer coat is a coat formed on said material to be coated and
said ETFE-based coating film is a coating film formed on said primer coat.

* * * * *